US012771432B2

(12) United States Patent
Gao et al.

(10) Patent No.: US 12,771,432 B2
(45) Date of Patent: Oct. 20, 2026

(54) SKYWAVE MASSIVE MIMO-OFDM TRIPLE BEAM-BASED CHANNEL MODELING AND CHANNEL INFORMATION ACQUISITION

(71) Applicant: Southeast University, Jiangsu (CN)

(72) Inventors: Xiqi Gao, Jiangsu (CN); Ding Shi, Jiangsu (CN); Linfeng Song, Jiangsu (CN); Wenqi Zhou, Jiangsu (CN); Chengxiang Wang, Jiangsu (CN); Wen Zhong, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 88 days.

(21) Appl. No.: 18/852,172

(22) PCT Filed: Mar. 3, 2023

(86) PCT No.: PCT/CN2023/079481
§ 371 (c)(1),
(2) Date: Sep. 27, 2024

(87) PCT Pub. No.: WO2023/185373
PCT Pub. Date: Oct. 5, 2023

(65) Prior Publication Data

US 2025/0350337 A1 Nov. 13, 2025

(30) Foreign Application Priority Data

Apr. 2, 2022 (CN) ......................... 202210343774.9

(51) Int. Cl.
*H04B 7/06* (2006.01)
*H04B 7/0413* (2017.01)
(Continued)

(52) U.S. Cl.
CPC ....... *H04B 7/06952* (2023.05); *H04B 7/0413* (2013.01); *H04B 17/391* (2015.01); *H04J 13/0062* (2013.01); *H04L 25/0224* (2013.01)

(58) Field of Classification Search
CPC .............. H04B 7/06952; H04B 7/0413; H04B 17/391; H04J 13/0062; H04L 25/0224
(Continued)

(56) References Cited

U.S. PATENT DOCUMENTS

2019/0288780 A1 9/2019 Rodriguez-Herrera et al.
2025/0184970 A1* 6/2025 Li ........................ H04B 17/328

FOREIGN PATENT DOCUMENTS

CN 112511201 A 3/2021
CN 115065432 A 9/2022

OTHER PUBLICATIONS

Shi, Ding et al. "Channel Estimation for HF Skywave Massive MIMO-OFDM with Triple Beam Based Channel Model" 2022 IEEE Global Communication Conference: Wireless Communications, Jan. 11, 2023 (Jan. 11, 2023), pp. 1-16 (Year: 2023).*
(Continued)

*Primary Examiner* — Kevin M Burd
(74) *Attorney, Agent, or Firm* — MUNCY, GEISSLER, OLDS & LOWE, P.C.

(57) ABSTRACT

Disclosed by the present disclosure is a skywave massive MIMO-OFDM triple beam-based channel modeling as well as related methods and systems for channel information acquisition. Established by the present disclosure is a skywave massive MIMO-OFDM triple beam-based statistical channel model, where a spatial-frequency-time domain channel vector is expressed as a product of a triple beam matrix and a triple beam domain channel vector; the triple beam matrix is composed of sampled triple steering vectors corresponding to one set of sampling points of a direction
(Continued)

cosine, a time delay, and a Doppler frequency that are selected by a base station; where each of the sampled triple steering vectors is called as a triple beam. Based on the triple beam-based statistical channel model, the base station groups each of the users and allocates pilot sequences by utilizing the statistical channel information; the base station obtains an estimated triple beam domain channel vector by using the received pilot signal, and obtains the spatial-frequency-time domain channel vector for the pilot band and the data band according to the triple beam-based statistical channel model. The present disclosure performs a more accurate channel modeling, which can reduce pilot overhead and computational complexity.

16 Claims, 5 Drawing Sheets

(51) Int. Cl.

| | |
|---|---|
| ***H04B 17/391*** | (2015.01) |
| ***H04J 13/00*** | (2011.01) |
| ***H04L 25/02*** | (2006.01) |

(58) Field of Classification Search
USPC .......................................................... 375/262
See application file for complete search history.

(56) References Cited

OTHER PUBLICATIONS

Shi. Ding et al. "Channel Acquisition for HF Skywave Massive MIMO-OFDM Communications" *IEEE Transactions on Wireless Communications*, Dec. 1, 2022, pp. 1-6.
Shi, Ding et al. "Channel Estimation for HF Skywave Massive MIMO-OFDM with Triple-Beam Based Channel Model" *2022 IEEE Global Communications Conference: Wireless Communications*, (Jan. 11, 2023), pp. 1-16.
Qualcomm Incorporated. "Channel model forFR2 MIMO OTA" 3GPP TSG-RAN WG4 Meeting #90 R4-1900754, Mar. 1, 2019 (Mar. 1, 2019), pp. 1-5.

* cited by examiner

SKYWAVE MASSIVE MIMO-OFDM TRIPLE BEAM-BASED CHANNEL MODELING AND CHANNEL INFORMATION ACQUISITION

TECHNICAL FIELD

The present disclosure belongs to a field of communication technology, and relates to a skywave massive MIMO-OFDM triple beam-based channel modeling and related methods and systems for channel information acquisition.

BACKGROUND

The working frequency band of skywave communication generally ranges from 3 MHz to 30 MHz, which can implement long-distance communication of thousands of kilometers through the ionosphere reflection, to implement a deep coverage of the global network. In comparison with the satellite communication used for global coverage, the skywave communication is equipped with many advantages, such as a flexible configuration, a lower cost, a strong anti-interference ability, and a long-distance communication without relays. However, due to limited spectrum resources and complex ionospheric conditions, and the like, the data transmission rate of traditional skywave communication is generally relative low, thus causing the skywave communication to be in a disadvantage in the competition with the satellite communication for such a long time.

Massive MIMO Multiple-Input Multiple-Output (MIMO) technology can simultaneously serve a large number of users at the same time-frequency resources by configuring a large number of antennas at the base station side, thereby greatly improving spectral efficiency and power efficiency. The massive MIMO technology is widely studied in terrestrial cellular communication and becomes one of the key technologies in 5G systems. The spectrum efficiency and power efficiency of the skywave communication are effectively improved by applying massive MIMO technology to the skywave communication. And as a multi carrier modulation technology, Orthogonal Frequency Division Multiplexing (OFDM) technology can effectively combat the impacts of frequency selective fading in broadband skywave communication. Therefore, the massive MIMO-OFDM skywave communication is an important development direction for the future skywave communication.

The performance of the massive MIMO depends on the accuracy of the acquired channel state information (CSI), thus the CSI acquisition is crucial for the massive MIMO system. The massive MIMO channel estimation is widely studied in terrestrial cellular communication, whereas in the skywave massive MIMO-OFDM communication, since the the number of the antennas and the number of the users are increasing, the traditional orthogonal pilot design and channel estimation algorithms significantly increase pilot overhead and computational complexity. And the performance of the CSI acquisition depends on the accuracy of the channel model. The current existing channel models are mostly the beam domain statistical channel models based on discrete Fourier transform, for practical systems with the limited number of the antennas, the error of this type of channel modeling is relative large, leading to a decrease in channel estimation performance. For the skywave massive MIMO-OFDM channel modeling, the current existing spatial beam-based statistical channel model merely considers the sparse characteristics in the angular domain. Therefore, how to model the skywave massive MIMO-OFDM channel in a more accurate way, and how to reduce pilot overhead and how to design a method for acquiring low complexity channel information have become urgent problems that is required to be solved in the skywave massive MIMO-OFDM system.

SUMMARY

Objectives of the present disclosure: in view of the disadvantages of the prior art, the present disclosure proposes a skywave massive MIMO-OFDM triple beam-based statistical channel model, the model can implement channel modeling in a more accurate way, and the present disclosure further provides related methods and systems for channel information acquisition, the methods and the systems can further reduce pilot overhead and computational complexity while ensuring the accuracy of the acquired channel information.

Technical solutions: in order to achieve the above objectives, the present disclosure provides following technical solutions.

Provided is a skywave massive MIMO-OFDM triple beam-based channel modeling method, and the method includes following steps.

A base station selects sampled triple steering vectors corresponding to one set of sampling points of a direction cosine, a time delay, and a Doppler frequency, to form a triple beam matrix, each of the sampled triple steering vectors is called as one triple beam, and composed of a sampled spatial domain steering vector, a sampled frequency domain steering vector, and a sampled time domain steering vector.

The triple beam matrix is multiplied with the triple beam domain channel vector, and a spatial-frequency-time domain channel vector is obtained, the triple beam domain channel vector is one stochastic vector with independent and non identically distributed elements.

Further, a sampling range of the direction cosine ranges from −1 to 1, a sampling range of the time delay ranges from 0 to a maximum time delay extension, and a sampling range of the Doppler frequency ranges from a negative maximum Doppler frequency to a positive maximum Doppler frequency; and a sampling method is uniform sampling.

Further, the number of the sampling points divided to the direction cosine, the time delay, and the Doppler frequency is divided into the number that is greater than, equal to, or less than the number of antennas, the number of equivalent time delay extension points and the number of equivalent Doppler extension points, respectively; the equivalent delay extension points are obtained by multiplying a ratio of the number of effective subcarriers to the number of total subcarriers by a length of a cyclic prefix; and the equivalent Doppler spread points are obtained by multiplying twice the maximum Doppler frequency by a total duration of one frame.

Provided is a skywave massive MIMO-OFDM triple beam-based statistical channel model. A spatial-frequency-time domain channel vector is expressed as a product of a triple beam matrix and a triple beam domain channel vector; the triple beam matrix is composed of sampled triple steering vectors corresponding to one set of sampling points of a direction cosine, a time delay, and a Doppler frequency that are selected by a base station; each of the sampled triple steering vectors is called as one triple beam, and is composed of a sampled spatial domain steering vector, a sampled frequency domain steering vector, and a sampled time domain steering vector; and the triple beam domain channel vector is one stochastic vector with independent and non identically distributed elements.

Provided is a method for grouping users and scheduling pilots of a skywave massive MIMO-OFDM. The method includes following steps.

A base station groups users by utilizing triple beam domain statistical channel information or spatial beam domain statistical channel information based on the triple beam-based statistical channel model; the spatial beam domain statistical channel information is the sum of the triple beam domain statistical channel information along a frequency beam domain dimension and a time beam domain dimension.

Different pilot sequences are allocated by the base station to each of user groups, users within one same group reuse one same pilot sequence, whereas users in different groups use different pilot sequences.

Further, criteria for grouping users are that a channel overlap between arbitrary two users in the same group should be minimized as much as possible; two users with high channel overlap should be allocated to different groups as much as possible.

Further, the channel overlap between the users is calculated and obtained by utilizing the triple beam domain statistical channel information or the spatial beam domain statistical channel information.

Further, the used pilot sequence is a sequence generated after modulating a Zadoff Chu sequence with different phase shift factors.

Provided is a method for estimating a skywave massive MIMO-OFDM channel. The method includes following steps.

A base station receives pilot signals sent by each of the users in a pilot frequency band of a wireless frame in an uplink, and estimated triple beam domain channel vector is obtained by utilizing received pilot signals.

The spatial-frequency-time domain channel vectors for the pilot frequency band and a data band are obtained by utilizing the estimated triple beam domain channel vector according to the triple beam-based statistical channel model.

Further, a channel estimation algorithm based on a minimization constraint of Bethe free energy is adopted as an estimation algorithm of the triple beam domain channel vector.

Further, the channel estimation algorithm based on a minimization constraint of the Bethe free energy transforms a channel estimation problem into an optimization problem that minimizes the constraint of the Bethe free energy, an objective function of the optimization problem is the Bethe free energy, and constraint conditions include various combinations of a mean consistency constraint, a mean square consistency constraint, a variance consistency constraint, an average mean square consistency constraint, and a mean variance consistency constraint.

Further, a Lagrange multiplier method is adopted as a solving method of the optimization problem.

Further, in a process of a channel estimation as well as in a transformation process between the triple beam domain channel vector and the spatial-frequency-time domain channel vector, operations involving a triple beam matrix or a conjugate transpose multiplied vector for the triple beam matrix are quickly implemented through a chirp-z transform.

Provided is a computer device. The device comprises a memory, a processor, and a computer program that is stored on the memory and is capable of running on the processor, the computer program is loaded onto the processor to implement the triple beam-based channel modeling method, the method for grouping users and scheduling pilots as well as the channel estimation method.

Provided is a skywave massive MIMO-OFDM communication system, including a base station and a plurality of user terminals. The base station is configured to generate a triple beam-based statistical channel model, and to utilize the statistical channel information to group each of the users and schedule the pilot to each of the users. The base station groups users by utilizing triple beam domain statistical channel information or spatial beam domain statistical channel information, the spatial beam domain statistical channel information is the sum of the triple beam domain statistical channel information along a frequency beam domain dimension and a time beam domain dimension. Different pilot sequences are allocated by the base station to each of user groups, users within one same group reuse one same pilot sequence, whereas users in different groups use different pilot sequences.

Provided is a skywave massive MIMO-OFDM communication system, including a base station and a plurality of user terminals. The base station is configured to generate a triple beam-based statistical channel model, and obtain estimated triple beam domain channel vector by utilizing received pilot signals in an uplink, and obtain the spatial-frequency-time domain channel vectors for the pilot frequency band and a data band by utilizing the estimated triple beam domain channel vector according to the triple beam-based statistical channel model. The user terminals are used to send a pilot sequence in the pilot frequency band of the wireless frame in the uplink.

The beneficial effects: in comparison with the prior art, the advantages of the present disclosure are as follows.

1. The present disclosure establishes a more accurate triple beam-based statistical channel model, and provides the transformation relations between the spatial-frequency-time domain channels and the triple beam domain channels, which are beneficial for obtaining more accurate channel information.
2. The present disclosure utilizes channel statistical information to group users and schedule pilots according to the triple beam-based statistical channel model, which can ensure that pilot overhead can be effectively reduced while ensuring the accuracy of channel information.
3. The present disclosure utilizes the sparse characteristics of the skywave channel in the triple beam domain as well as the structural characteristics of the triple beam matrix to reduce the complexity of channel information acquisition. In addition, the present disclosure also proposes a channel estimation algorithm on the basis of minimizing the constrained Bethe free energy according to the theory of minimizing the constrained Bethe free energy in the channel estimation algorithm, and further reduces the computational complexity of the algorithm by utilizing the structural characteristics of the triple matrix and the chirp-z transform.

DETAILED DESCRIPTION OF THE EMBODIMENTS

The technical solutions provided by the present disclosure will be clarified in details in conjunction with the specific embodiments. It should be understood that the following specific embodiments are merely used to illustrate the present disclosure and not to limit the scope of the present disclosure.

The embodiments of the present disclosure disclose a skywave massive MIMO-OFDM triple beam-based statistical channel model, the spatial-frequency-time domain channel vector is expressed as the product of the triple beam matrix and the triple beam domain channel vector. The triple beam-based channel modeling method is specifically as follows. The base station selects sampled triple steering vectors corresponding to one set of sampling points of a direction cosine, a time delay, and a Doppler frequency, to form a triple beam matrix, each of the sampled triple steering vectors is called as a triple beam, and composed of a sampled spatial domain steering vector, a sampled frequency domain steering vector, and a sampled time domain steering vector. The triple beam matrix is multiplied with the triple beam domain channel vector, and a spatial-frequency-time domain channel vector is obtained, the triple beam domain channel vector is one stochastic vector with independent and non identically distributed elements.

A sampling range of the direction cosine ranges from −1 to 1, a sampling range of the time delay ranges from 0 to a maximum time delay extension, and a sampling range of the Doppler frequency ranges from a negative maximum Doppler frequency to a positive maximum Doppler frequency; and a sampling method is uniform sampling. The number of the sampling points respectively divided to the direction cosine, the time delay, and the Doppler frequency can be set flexibly, the number of the sampling points divided to the direction cosine, the time delay, and the Doppler frequency is the number that is greater than, equal to, or less than the number of antennas, the number of equivalent time delay extension points and the number of equivalent Doppler extension points, respectively; the equivalent delay extension points are obtained by multiplying a ratio of the number of effective subcarriers to the number of total subcarriers by a length of a cyclic prefix; and the equivalent Doppler spread points are obtained by multiplying twice the maximum Doppler frequency by a total duration of one frame.

Figure 1:
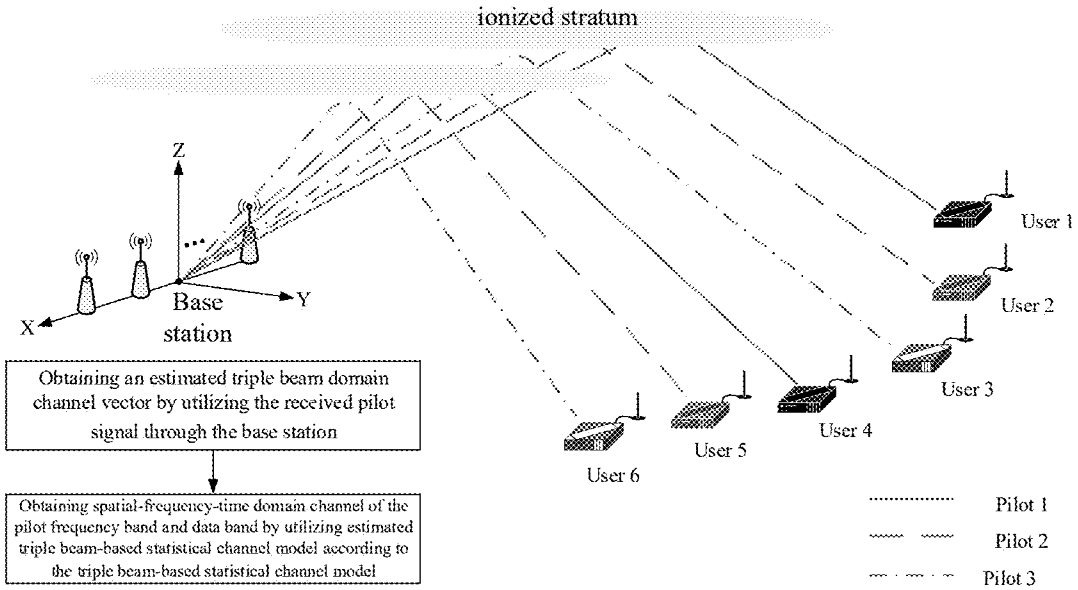
FIG. 1 illustrates a schematic diagram of a method for obtaining channel information of a skywave massive MIMO-OFDM provided by one embodiment of the present disclosure.

As illustrated in FIG. 1, based on the above triple beam-based statistical channel model, the skywave massive MIMO-OFDM channel information acquisition disclosed by the embodiments of the present disclosure mainly relates to two aspects, that is, user grouping and pilot scheduling, as well as channel estimation. The method for grouping users and scheduling pilots includes following steps. A base station groups users by utilizing triple beam domain statistical channel information or spatial beam domain statistical channel information, and allocates different pilot sequences to each of user groups, thus the users within the same group reuse the same pilot sequence, whereas users in different groups use different pilot sequences. The method for estimating channel includes the following steps. In the uplink, each of the users sends the allocated pilot sequence in the pilot frequency band of the wireless frame, and the base station obtains the estimated triple beam domain channel vector by utilizing the received pilot signals. The spatial-frequency-time domain channel vectors of the pilot frequency band and a data band are obtained by utilizing the estimated triple beam domain channel vector according to the triple beam-based statistical channel model.

Figure 2:
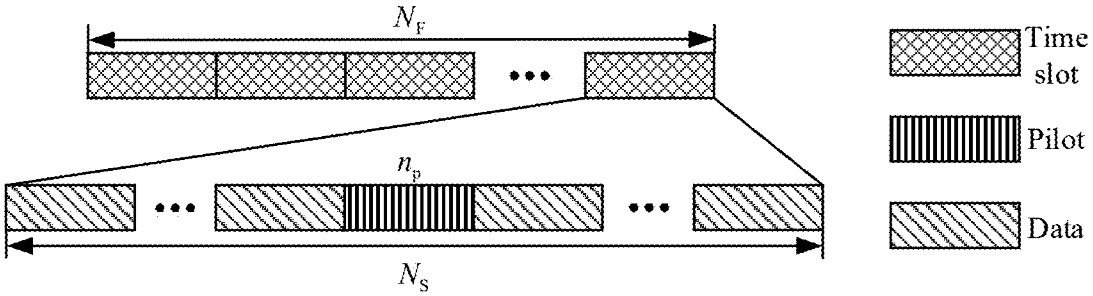
FIG. 2 illustrates a schematic diagram of a wireless frame structure provided by one embodiment of the present disclosure.

FIG. 2 illustrates a wireless frame structure where each wireless frame contains $N_F$ time slots and each of the time slots contains $N_S$ OFDM symbols. In each of the time slots, the $n_p$-th OFDM symbol is used to transmit pilot sequences for channel estimation, while the remaining OFDM symbols are used to transmit uplink data and downlink data.

Figure 3:
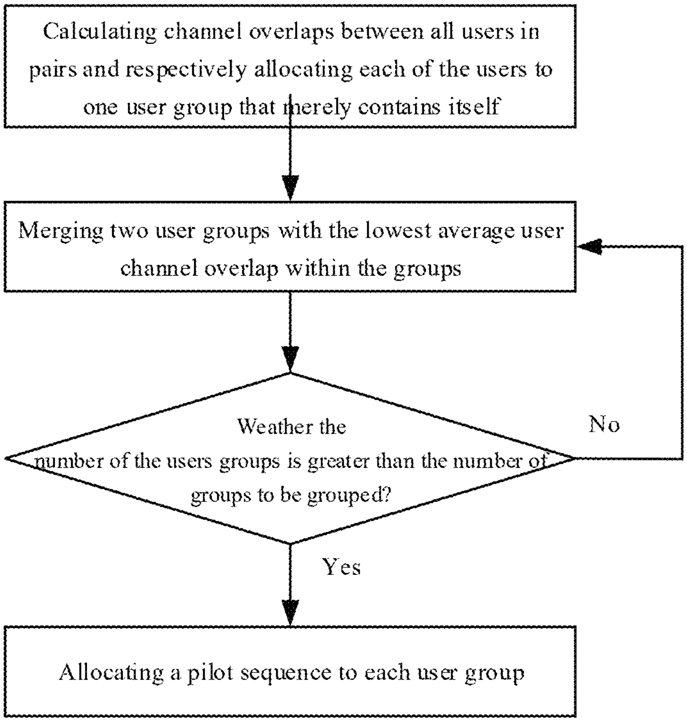
FIG. 3 illustrates a flowchart of an algorithm for grouping users and scheduling pilots provided by one embodiment of the present disclosure.

The criteria for grouping users are that a channel overlap between arbitrary two users in the same group should be minimized as much as possible; two users with high channel overlap should be allocated to different groups as much as possible. FIG. 3 illustrates a method for grouping users and scheduling pilots, and the method includes following steps. 1) Firstly, the channel overlap between all users in pairs is calculated and each of the users is respectively allocated to one user group that merely contains itself. 2) Then, the two user groups with the lowest average user channel overlap within the groups are merged. 3) the current number of the user groups whether is greater than the number of groups to be grouped is determined, in a case where the number is greater than the number of groups to be grouped, Step 2) is returned to, otherwise Step 4) is proceeded. 4) One pilot sequence is allocated to each of the user groups.

The method of the present disclosure is mainly applied to a skywave massive MIMO-OFDM system equipped with massive antenna arrays at the base station side to simultaneously serve a plurality of users. The specific implementation process of the channel information acquisition method involved in the present disclosure will be clarified in details in conjunction with the specific communication system embodiments. It should be noted that the method provided by present disclosure is not only applied to the specific system models presented in the embodiments below, but also to other configured system models.

1. System configuration

In this embodiment, a skywave massive MIMO-OFDM system is considered. The base station is configured with a uniform linear array, with antenna M serving U single antenna users. In OFDM modulation, the number of carriers is $N_c$, the length of the cyclic prefix is $N_g$, the subcarrier interval is $\Delta f$, and the sampling interval is $T_s=1/N_c\Delta f$. The number of effective subcarriers used for transmitting data and pilots is $N_v$, and the index set of the effective subcarriers is expressed as $K=\{k_0, k_1, \ldots, k_{N_v-1}\}$. In the skywave communication, the system carrier frequency $f_c$ requires to vary with ionospheric conditions. Therefore, the antenna interval d of the array is set according to the system highest operating frequency $f_0$, that is, $d=\lambda_0/2$, where $\lambda_0=c/f_0$, and C denotes the speed of light.

In a case where the skywave massive MIMO-OFDM system works under the Time Division Multiplexing (TDD) mode, and the wireless frame structure is as illustrated in FIG. 2. Each wireless frame contains $N_F$ time slots, and each of the time slots contains $N_S$ OFDM symbols, thus the total number of OFDM symbols in one frame is expressed as $N=N_F N_S$. In each of the time slots, the $n_p$-th OFDM symbol is used to transmit the pilot sequences for the channel estimation, whereas the remaining OFDM symbols are used to transmit uplink and downlink data.

2. Triple Beam-Based Statistical Channel Model

Letting $x_{u,m,k}$ denotes the data transmitted by the u-th user on the k-th subcarrier of the n-th OFDM symbol, where $n\in\{0,1, \ldots, N-1\}$ and $k\in K$. After the OFDM modulation, the analog baseband signal with a cyclic prefix transmitted by the u-th user on the n-th OFDM symbol can be expressed as $$\overline{x}_{u,n}(t) = \sum_{k=k_0}^{k_{N_v}-1} x_{u,n,k} e^{-\Phi 2\pi k\Delta ft}, \ -N_g T_s \le t - nT_{sym} < N_c T_s, \quad (1)$$

where $T_{sym}=(N_c+N_g)T_s$ denotes a duration of one OFDM symbol containing a cyclic prefix. At the base station side, the analog baseband signal received on the n-th OFDM symbol of the m-th antenna is expressed as $$\overline{y}_{m,n}(t) = \sum_{u=0}^{U-1} \int_{-\infty}^{\infty} \overline{h}_{u,m}(t, \tau)\overline{x}_{u,n}(t-\tau)d\tau + \overline{z}_{m,n}(t), \quad (2)$$

where $m\in\{0,1, \ldots, M-1\}$, $\overline{z}_{m,n}(t)$ denotes an additive Gaussian white noise, $\overline{h}_{u,m}(t,\tau)$ denotes a time-varying channel impulse between the user u and the m-th antenna of the base station, and the channel impulse response can be expressed as $$\overline{h}_{u,m}(t, \tau) = \sum_{p=0}^{P_u-1} \gamma_{u,p} e^{\Phi 2\pi\nu_{u,p}t} e^{-\Phi 2\pi f_c m\Delta\tau\Omega_{u,p}} \delta(\tau - \tau_{u,p} - m\Delta\tau\Omega_{u,p}), \quad (2)$$

where $P_u$ denotes the number of paths between the user u and the base station, $\gamma_{u,p}$, $\nu_{u,p}$ and $\Omega_{u,p}$ denote a complex gain, a Doppler frequency, and a direction cosine of the p-th path of the user u, respectively, and $\tau_{u,p}$ denotes the time delay of the p-th path between the user u and the first antenna of the base station, and $\Delta\tau=d/c$ In Formula (3), the complex gain can be expressed as $\gamma_{u,p}=\beta_{u,p}e^{\Phi\varphi_{u,p}}$,where $\beta_{u,p}$ and $\varphi_{u,p}$ denote the gain and initial phase, respectively, and $\varphi_{u,p}$ is uniformly distributed within $[0,2\pi)$ The direction cosine is defined as $$\Omega_{u,p} = \sin\theta_{u,p}^{az}\cos\theta_{u,p}^{el}, \text{ where } \theta_{u,p}^{az} \text{ and } \theta_{u,p}^{el}$$

are the arrival azimuth angle and arrival elevation angle, respectively. Due to the spatial broadband effects caused by the equipped massive antenna array and the wider transmission bandwidth, the transmission delay along the antenna array, that is, $m\Delta\tau\Omega_{u,p}$ is considered.

It is assumed that the channel remains unvaried within an OFDM symbol and varies between the OFDM symbols due to the Doppler effect. After the OFDM demodulation, the received data on the k-th subcarrier of the n-th OFDM symbol of the m-th antenna can be represented as $$y_{m,n,k} = \sum_{u=0}^{U-1} h_{u,m,n,k}^{SFT} x_{u,n,k} + z_{m,n,k} \quad (3)$$

where $z_{m,m,k}$ denotes an additive white Gaussian noise, and denotes a complex Gaussian stochastic variable with a mean of 0 and a variance of $$\sigma_z^2, h_{u,m,n,k}^{SFT}$$

denotes the channel frequency response on the k-th subcarrier of the n-th OFDM symbol between the user u and the m-th antenna of base station, and $$h_{u,m,n,k}^{SFT}$$

is expressed as $$h_{u,m,n,k}^{SFT} = \sum_{p=0}^{P_u-1} \gamma_{u,p} e^{\Phi 2\pi\nu_{u,p}nT_{sym}} e^{-\Phi 2\pi f_c m\Delta\tau\Omega_{u,p}} e^{-\Phi 2\pi k\Delta f\tau_{u,p}} e^{-\Phi 2\pi k\Delta fm\Delta\tau\Omega_{u,p}}. \quad (4)$$

It is considered that the spatial-frequency domain channel on N OFDM symbols between the user u and base station, and the spatial-frequency domain channel is defined as a spatial frequency time domain channel vector $$h_u^{SFT},$$

where the $(nMN_v+(k-k_0)M+m)$-th element is expressed as $$h_{u,m,n,k}^{SFT}.$$

It is defined that $$v_k(\Omega) = \left[1, \ e^{-\Phi 2\pi(f_c+k\Delta f)\Delta\tau\Omega}, \ \ldots, \ e^{\Phi 2\pi(f_c+k\Delta f)(M-1)\Delta\tau\Omega}\right]^T \in \square^{M\times 1} \quad (5)$$

$$u(\tau) = \left[e^{-\Phi 2\pi k_0\Delta f\tau}, \ e^{-\Phi 2\pi k_1\Delta f\tau}, \ \ldots, \ e^{-\Phi 2\pi k_{N_v-1}\Delta f\tau}\right]^T \in \square^{N_v\times 1}, \text{ and} \quad (6)$$

$$d(\nu) = \left[1, \ e^{\Phi 2\pi\nu T_{sym}}, \ \ldots, \ e^{\Phi 2\pi\nu(N-1)\tau_{sym}}\right]^T \in \square^{N\times 1} \quad (7)$$

denote the spatial domain steering vector, the frequency domain steering vector, and the time domain steering vector pointing to the direction cosine $\Omega$, the time delay $\tau$, and Doppler frequency $\nu$, respectively, where the superscript T denotes the transposition. It can be observed that due to the spatial broadband effects, the spatial domain steering vectors of different subcarriers are different. It can be understood by a person skilled in the art that the above spatial domain steering vector representation is merely an example of the base station using a uniform linear array and the user with a single antenna, and in a case where the base station uses different antenna arrays such as a uniform planar array and a uniform circular array and the user uses a multi antenna system, it is merely required to vary the $v_k(\Omega)$ to corresponding spatial domain steering vector. It is defined that $$p(\Omega, \tau, \nu) = d(\nu) \otimes (v(\Omega) \circ (u(\tau) \otimes e_M)) \in \mathbb{C}^{MN_vN\times 1}, \tag{8}$$

where $e_M=[1, 1, \ldots, 1]^T \in \mathbb{C}^{M\times 1}$, $\otimes$ denotes a Kronecker product, and $\circ$ denotes a Hadamard product, and $$v(\Omega) = \left[v_{k_0}(\Omega)^T, v_k(\Omega)^T, \ldots, v_{k_{N_v-1}}(\Omega)^T\right]^T \in \mathbb{C}^{MN_v\times 1}, \tag{9}$$

Thus, the spatial-frequency-time domain channel vector for the user u can be represented as $$h_u^{SFT} = \sum_{p=0}^{P_u-1} \gamma_{u,p}\, p(\Omega_{u,p}, \tau_{u,p}, \nu_{u,p}) \in \mathbb{C}^{MN_vN\times 1}, \tag{10}$$

where in this physical channel, $p(\Omega_{u,p}, \tau_{u,p}, \nu_{u,p})$ denotes a triple rudder vector pointing to the channel parameter $(\Omega_{u,p}, \tau_{u,p}, \nu_{u,p})$.

The parameter $(\Omega_{u,p}, \tau_{u,p}, \nu_{u,p})$ for each of the paths of each user is limited to the sets of $B_{an}=\{\Omega|\Omega\in[-1,1)\}$, $B_{de}=\{\tau|\tau\in[0, \tau_{max})\}$ and $B_{do}=\{\nu|\nu\in[-\nu_{max}, \nu_{max})\}$, where $$\tau_{max} = \frac{N_g}{N_c\Delta f}$$

denotes the maximum delay spread, $$\nu_{max} = \frac{N_d}{2NT_{sym}}$$

denotes the maximum Doppler frequency, and $N_d$ denotes the equivalent number of Doppler spread points. The above sets are evenly divided into a plurality of subsets, that is $$B_{an} = \bigcup_{n_{an}=0}^{N_{an}-1} \Lambda_{n_{an}}^{an},\ \Lambda_{n_{an}}^{an} = \left[\frac{2n_{an}-N_{an}}{N_{an}}, \frac{2n_{an}-N_{an}+2}{N_{an}}\right) \tag{11}$$

$$B_{de} = \bigcup_{n_{de}=0}^{N_{de}-1} \Lambda_{n_{de}}^{de},\ \Lambda_{n_{de}}^{de} = \left[\frac{N_\tau n_{de}}{N_{de}N_v\Delta f}, \frac{N_\tau(n_{de}+1)}{N_{de}N_v\Delta f}\right) \tag{12}$$

$$B_{do} = \bigcup_{n_{do}=0}^{N_{do}-1} \Lambda_{n_{do}}^{do},\ \Lambda_{n_{do}}^{do} = \left[\frac{N_d(n_{do}-N_{do}/2)}{N_{do}NT_{sym}}, \frac{N_d(n_{do}-N_{do}/2+1)}{N_{do}NT_{sym}}\right), \tag{13}$$

where $$N_\tau = \frac{N_vN_g}{N_c}$$

denotes the number of equivalent delay extension points, and $$\frac{2}{N_{an}}\ \frac{N_\tau}{N_{de}N_v\Delta f}\ \text{and}\ \frac{N_d}{N_{do}NT_{sym}}$$

denote the interval of the direction cosine, interval of the time delay, and the interval of the Doppler frequency, respectively.

It is defined that $$\Gamma_u^{an} = \{\Omega_{u,0}, \Omega_{u,1}, \ldots, \Omega_{u,P_u-1}\},$$

$$\Gamma_u^{de} = \{\tau_{u,0}, \tau_{u,1}, \ldots, \tau_{u,P_u-1}\}\ and\ \Gamma_u^{do} = \{\nu_{u,0}, \nu_{u,1}, \ldots, \nu_{u,P_u1}\}$$

denote the direction cosine set, the time delay set, and the Doppler frequency set of all paths of user u, respectively. Letting $$\Gamma_u = \Gamma_u^{an} \times \Gamma_u^{de} \times \Gamma_u^{do},$$

and Formula (11) can be rewritten as $$h_u^{SFT} = \sum_{n_{an}=0}^{N_{an}-1}\sum_{n_{de}=0}^{N_{de}-1}\sum_{n_{do}=0}^{N_{do}-1}\ \sum_{(\Omega_{u,p},\tau_{u,p},\nu_{u,p})\in\Gamma_u\cap\Lambda_{n_{an},n_{de},n_{do}}} \gamma_{u,p}\, p(\Omega_{u,p}, \tau_{u,p}, \nu_{u,p}) \tag{14}$$

where the triple steering vector $p(\Omega_{u,p}, \tau_{u,p}, \nu_{u,p})$ satisfying $(\Omega_{u,p}, \tau_{u,p}, \nu_{u,p})\in\Gamma_u\cap\Lambda_{n_{an}, n_{de}, n_{do}}$ is approximated into a sampled triple steering vector $p(\Omega_{n_{an}}, \tau_{n_{de}}, \nu_{n_{do}})$ which is also called as a triple beam, where $$\Omega_{n_{an}} = \frac{2n_{an}-N_{an}}{N_{an}},\ \tau_{n_{de}} = \frac{N_\tau n_{de}}{N_{de}N_v\Delta f}\ \text{and}\ V_{n_{do}} = \frac{N_d(n_{do}-N_{do}/2)}{N_{do}NT_{sym}}$$

denotes the sampling points divided for the direction cosine, the time delay, and the Doppler frequency, respectively, and the number of sampling points $N_{an}$, $N_{de}$ and $N_{do}$ can be flexibly set.

A triple beam matrix P composed of the sampled triple steering vector is defined, whose the $(n_{do}N_{an}N_{de}+n_{de}N_{an}+n_{an})$-th column is expressed as $p(\Omega_{n_{an}}, \tau_{n_{de}}, \nu_{n_{do}})$. According to Formula (9), each sampled triple steering vector can be regarded as being composed of the sampled spatial domain steering vector $v_k(\Omega_{n_{an}})$, the sampled frequency domain steering vector $u(\tau_{n_{de}})$, and sampled time domain steering vector $d(\nu_{n_{do}})$, and the triple beam matrix can be expressed as $$P = D \otimes \left(V\left(U \otimes I_{N_{an}}\right)\right) \in \mathbb{C}^{MN_vN\times N_{an}N_{de}N_{do}} \tag{15}$$

where $$D \in \mathbb{C}^{N \times N_{do}},\ [D]_{i,j} = e^{-\bar{\jmath}2\pi i \frac{N_d(j-N_{do}/2)}{N_{do}N}},$$

the subscript i,j denotes the elements in the i-th row and the j-th column of the matrix, $$U \in \mathbb{C}^{N_v \times N_{de}},\ [U]_{i,j} = e^{-\bar{\jmath}2\pi(i+k_0)\frac{N_\tau j}{N_{de}N_v}},\ V = \operatorname{diag}\left\{V_{k_0}, \ldots, V_{k_{N_v-1}}\right\},$$

$$V_k \in \mathbb{C}^{M \times N_{an}},\ [V_k]_{i,j} = e^{-\bar{\jmath}2\pi(f_c+k\Delta f)i\Delta\tau\frac{2j-N_{an}}{N_{an}}} \text{ and } \operatorname{diag}\left\{V_{k_0}, \ldots, V_{k_{N_v-1}}\right\}$$

denote the diagonal matrix formed by the $V_{k_0}, \ldots, V_{k_{NV-1}}$.

The spatial-frequency-time domain channel vector in Formula (15) can be approximated as $$h_u^{SFT} = P h_u^{TB}, \tag{16}$$

where $$h_u^{TB} \in \mathbb{C}^{N_{an}N_{de}N_{do} \times 1}$$

can be expressed as $$\left[h_u^{TB}\right]_{n_{do}N_{an}N_{de}+n_{de}N_{an}+n_{an}} = \sum_{(\Omega_{u,p},\tau_{u,p},\nu_{u,p}) \in \Gamma_u \cap \Lambda_{n_{an},n_{de},n_{do}}} \gamma_{u,p}, \tag{17}$$

where Formula (17) is called as the triple beam based statistical channel model, $$h_u^{TB}$$

denotes the triple beam domain channel vector of the user u and denotes one stochastic vector with independent and non identical elements. Further, the covariance matrix of the spatial-frequency-time domain channel vector of the user u is expressed as $$R_u^{SFT} = E\left\{h_u^{SFT}\left(h_u^{SFT}\right)^H\right\} = PE\left\{h_u^{TB}\left(h_u^{TB}\right)^H\right\}P = PR_u^{TB}P \in \mathbb{C}^{MN_vN \times MN_vN}, \tag{18}$$

where the superscript H denotes the conjugate transpose, $E\{\cdot\}$ denotes obtaining expected value, and $$R_u^{TB} = E\left\{h_u^{TB}\left(h_u^{TB}\right)^H\right\} \in \mathbb{C}^{N_{an}N_{de}N_{do} \times N_{an}N_{de}N_{do}}$$

denotes the covariance matrix of the triple beam domain channel vector for the user u, $$R_u^{TB} = E\left\{h_u^{TB}\left(h_u^{TB}\right)^H\right\} \in \mathbb{C}^{N_{an}N_{de}N_{do} \times N_{an}N_{de}N_{do}}$$

is also called as the triple beam domain statistical channel information, distributed as a diagonal matrix with the ($n_{do}N_{an}N_{de}+n_{de}N_{an}+n_{an}$)-th diagonal element being $$\sum_{(\Omega_{u,p}\tau_{u,p},\nu_{u,p}) \in \Gamma_u \cap \Lambda_{n_{an},n_{de},n_{do}}} \beta_{u,p}^2.$$

3. Pilot Design

According to Formula (17) and the frame structure in FIG. 2, the spatial-frequency-time domain channel vector of the pilot band can be represented as $$h_u^{SFT,p} = \tilde{P} h_u^{TB} \in \mathbb{C}^{MN_vN_F \times 1}, \tag{19}$$

where $$\tilde{P} = \left(\Theta \otimes I_{N_v} \otimes I_M\right)P = \tilde{D} \otimes \left(V\left(U \otimes I_{N_{an}}\right)\right) \in \mathbb{C}^{MN_vN_F \times N_{an}N_{de}N_{do}}, \tag{20}$$

where $I_N$ denotes the unit matrix of N dimension, the $n_F$-th row of $\Theta \in \mathbb{C}^{N_F \times N}$ denotes the ($n_FN_S+n_p$)-th row of $I_N$, and $\tilde{D}=\Theta D \in \mathbb{C}^{N_F \times N_{do}}$.

The pilot is required to be utilized for channel estimation in each time slot, in this situation, the current time slot is combined with the previous $N_F$-1 time slot of the current time slot to form a complete frame as illustrated in FIG. 2, and the current time slot is taken as the last time slot in the entire frame. In this situation, it is required to save the received signal of the pilot band in the previous $N_F$-1 time slot and utilize the received signal together with the received signal of the pilot band in the current time slot for channel estimation.

Letting $$x_u^p \in \mathbb{C}^{N_v \times 1}$$

denotes the pilot sequence transmitted by the user u on the effective subcarrier, then the received signal $y \in \mathbb{C}^{MN_vN_F \times 1}$ at the base station side can be expressed as $$y = \sum_{u=0}^{U-1} X_u h_u^{SFT,p} + z = X h^{SFT,p} + z \tag{21}$$

where $$h^{SFT,p} = \left[\left(h_0^{SFT,p}\right)^T, \left(h_1^{SFT,p}\right)^T, \cdots, \left(h_{U-1}^{SFT,p}\right)^T\right]^T \in \mathbb{C}^{MN_vN_FU \times 1},$$

$$X_u = I_{N_F} \otimes (\operatorname{diag}\{x_u^p\} \otimes I_M) \in \mathbb{C}^{MN_vN_F \times MN_vN_F},$$

$X=[X_0, X_1, \ldots, X_{U-1}] \in \mathbb{C}^{MN_vN_F \times MN_vN_FU}$, and $z \in \mathbb{C}^{MN_vN_F \times 1}$ denotes a noise vector composed of independent and identically distributed complex Gaussian stochastic variables with a mean of 0 and a variance of $$\sigma_z^2, \operatorname{diag}\{x_u^p\}$$

denotes a diagonal matrix formed by the diagonal element $$x_u^p.$$

By substituting Formula (20) into Formula (22), it can be obtained that $$y = X(I_U \otimes \tilde{P})h^{TB} + z = Ah^{TB} + z \tag{22}$$

where $$A = X(I_U \otimes \tilde{P}),$$

and $$h^{TB} = \left[(h_0^{TB})^T, (h_1^{TB})^T, \cdots, (h_{U-1}^{TB})^T\right]^T \in \Box^{N_{an}N_{de}N_{do}U\times 1}.$$

By using the pilot sequence, the $$x_u^p$$

can be expressed as the following formula $$x_u^P = \sigma_p x_c \circ \left[e^{-\bar{\o}2\pi k_0 \frac{N_\tau \phi_u}{N_{de}N_v}}, e^{-\bar{\o}2\pi k_1 \frac{N_\tau \phi_u}{N_{de}N_v}}, \cdots, e^{-\bar{\o}2\pi k_{N_v-1} \frac{N_\tau \phi_u}{N_{de}N_v}}\right]^T, \tag{23}$$

where $\sigma_p$ denotes the root mean square of the pilot transmitting power, $\phi_u \in \{0, N_{de}, \ldots, ([N_v/N_\tau]-1) N_{de}\}$ $\sigma_p$ denotes the phase shift factor, and $x_c$ denotes a sequence of each of the elements with a modulus of 1, and Zadoff Chu sequence can be selected, $[N_v/N_\tau]$ denotes the maximum integer not greater than $N_v/N_\tau$. In this situation, Formula (21) can be rewritten as $$\tilde{P} = \overline{P}\left(I_{N_{do}} \otimes I_{\lfloor N_v/N_\tau \rfloor N_{de}\times N_{de}} \otimes I_{N_{an}}\right) \tag{24}$$

where $$\overline{P} = \tilde{D} \otimes \left(V(\overline{U} \otimes I_{N_{an}})\right) \in \Box^{MN_vN_FN_{an}\lfloor N_v/N_\tau \rfloor N_{de}\times N_{do}},$$

and $$\overline{U} \in \Box^{N_v \times \lfloor N_v/N_\tau \rfloor N_{de}},$$

and $$\left[\overline{U}\right]_{i,j} = e^{-\bar{\o}2\pi(i+k_0)\frac{N_\tau j}{N_{de}N_v}}.$$

It can be observed that $X_u\tilde{P} = \sigma_p X_c \overline{P} S_u$, where $X_c = I_{N_F} \otimes (\mathrm{diag}\{x_c\} \otimes I_M)$, $S_u(I_{N_{do}} \otimes [O_{N_{de}\times\phi_u}, I_{N_{de}}, O_{N_{de}\times(([N_v/N_\tau]-1)N_{de}-\phi_i)}]^T \otimes I_{N_{an}})$ denotes a selecting matrix generated according to $\phi_u$. A can be rewritten as $$A = \sigma_p X_c \overline{P}[S_0, \cdots, S_{U-1}]. \tag{26}$$

Further, the channel overlap between the user u and the user u' is the overlap of the triple beam domain statistical channel information between the user u and the user u', that is, $$\rho_{u,u'} = \frac{tr\{R_u^{TB} R_{u'}^{TB}\}}{\|R_u^{TB}\|_F \|R_{u'}^{TB}\|_F}. \tag{27}$$

The following criteria are utilized to group all users into S ($S \le [N_v/N_\tau]$) user groups.

1) The channel overlaps between arbitrary two users in the same group should be minimized as much as possible.

2) Two users with high channel overlaps should be assigned to different groups as much as possible.

Then, pilot sequences with different phase shift factors are allocated to each user group, so that users in the same group reuse the same pilot sequence, and users in different groups use different pilot sequences.

Given is an algorithm for grouping users and scheduling pilots herein, and the algorithm includes following steps.

In Step 1, each of the users is respectively allocated to one user group that merely contains itself, that is, the index set $\Psi = \{0, 1, \ldots, U-1\}$ and user grouping results $Y_s = \{s\}$, $s \in \Psi$ of the user groups are initialized, and the channel overlap $\{\rho_{u,u'}, u, u' = 0, 1, \ldots, U-1\}$ between users is calculated by utilizing Formula (28).

In Step 2, it is determined whether the number of user groups is greater than the number of groups to be grouped, in a case where the number of user groups is greater than the number of groups to be grouped, Step 3 is proceeded, otherwise, Step 5 is proceeded.

In Step 3, the two user groups with the lowest average user channel overlap within the groups are found, that is, $$\{s_1, s_2\} = \arg\min_{s\in\Psi, s'\in\Psi\setminus s} \sum_{u\in Y_s, u'\in Y_{s'}} \frac{\rho_{u,u'}}{|Y_s||Y_{s'}|}.$$

In Step 4, the two user groups with the lowest average user channel overlap within the groups are merged, that is, $Y_{s1} \leftarrow Y_{s1} \cup Y_{s2}$, and Step 2 is returned to.

In Step 5, pilot sequences with different phase shift factors are allocated to each user group.

In addition to using the triple beam domain statistical channel information to calculate user channel overlap spatial $$R_u^B = \sum_{i=0}^{N_{de}N_{do}-1} \sum_{j=0}^{N_{de}N_{do}-1} \left[R_u^{TB}\right]_{iN_{an}:(i+1)N_{an}-1, jN_{an}:(j+1)N_{an}-1} \in \Box^{N_{an}\times N_{an}},$$

beam domain statistical channel information can also be used to calculate user channel overlap. The spatial beam domain statistical channel information is the sum of the triple beam domain statistical channel information along the frequency beam domain dimension and the time beam domain dimension, that is $$R_u^B = \sum_{i=0}^{N_{de}N_{do}-1} \sum_{j=0}^{N_{de}N_{do}-1} \left[R_u^{TB}\right]_{iN_{an}:(i+1)N_{an}-1, jN_{an}:(j+1)N_{an}-1} \in \Box^{N_{an}\times N_{an}}, \tag{28}$$

where $$\left[R_u^{TB}\right]_{a:b,c:d}$$

denotes the a-th row to the b-th row of the matrix and the c-th column to d-th column of the matrix. In this situation, the channel overlap between the user u and user u' can also be the overlap of channel information in the spatial beam domain between the user u and user u', that is $$\tilde{\rho}_{u,u'} = \frac{tr\{R_u^B R_{u'}^B\}}{\|R_u^B\|_F \|R_{u'}^B\|_F}, \tag{29}$$

where this channel overlap can also be used for grouping users and scheduling pilots, and the corresponding algorithm is similar to that of using $\rho_{u,u'}$ above, which merely requires to replace $\rho_{u,u'}$ with $\tilde{\rho}_{u,u'}$ in the algorithm.

4. Channel Estimation Algorithm

Traditional MMSE estimation can be performed on the triple beam domain channel vector, that is, $$\hat{h}^{TB} = R^{TB} A^H \left(A R^{TB} A^H + \sigma_z^2 I_{MN_vN_F}\right)^{-1} y,$$

where $$R^{TB} = \text{diag}\{R_0^{TB}, R_1^{TB}, \ldots, R_{U-1}^{TB}\},$$

the complexity $O((MN_vN_F)^3)$ of whom is relative high. Given below is a channel estimation algorithm on the basis of minimizing the constrained Bethe free energy with low complexity.

According to Formula (23), having $$\begin{aligned} p(h^{TB}, w \mid y) &= \frac{1}{p(y)} p(y \mid w) p(w \mid h^{TB}) p(h^{TB}) \\ &= \frac{1}{p(y)} \prod_{i=0}^{MN_vN_F 1} p(y_i \mid w_i) \prod_{i=0}^{MN_vN_F-1} p(w_i \mid h^{TB}) \\ &\quad \prod_{j=0}^{N_{an}N_{de}N_{do}U-1} p(h_j^{TB}), \end{aligned} \tag{30}$$

where $w = Ah^{TB} \in \square^{MN_vN_p \times 1}$ denotes an auxiliary vector, $p(w_i/h^{TB}) = \delta(w_i - a_i h^{TB})$, $a_i$ denotes the i-th row of A, $$h_j^{TB}$$

denotes the j-th element of $h^{TB}$, as well as $y_i$ and $w_i$ denote the i-th element of y and the i-th element of w, respectively.

Furthermore, a confidence function $b(h^{TB}, w)$ can be found within a given probability density function family Q to approximate the posterior probability density function $p(h^{TB}, w|y)$ by minimizing the variational free energy, that is, $$b(h^{TB}, w) = \underset{b(h^{TB}, w) \in Q}{\arg\min}\ F_v(b),$$

where $F_v(b)$ is defined as $$F_v(b) = D\{b(h^{TB}, w) \| p(h^{TB}, w \mid y)\} - \ln p(y), \tag{31}$$

where $D\{\cdot\}$ denotes the relative entropy. Then, by introducing the factor confidence function and the variable confidence function, the Bethe approximation is utilized to limit the range of the probability density function family Q. $b_{y,i}(w_i)$, $b_{w,i}(w_i, h^{TB})$, and $$b_{h,j}(h_j^{TB})$$

are defined as factor confidence functions for $p(y_i|w_i)$, $p(w_i|h^{TB})$, and $$p(h_j^{TB}),$$

respectively, and $q_{w,i}(w_i)$ and $$q_{h,j}(h_j^{TB})$$

are taken as variable confidence functions for $w_i$ and $$h_j^{TB}.$$

According to the approximation of Bethe, $b(h^{TB}, w)$ can be expressed as $$b(h^{TB}, w) = \frac{\prod_{i=0}^{MN_vN_F-1} b_{y,i}(w_i) b_{w,i}(w_i, h^{TB}) \prod_{j=0}^{N_{an}N_{de}N_{do}U-1} b_{h,j}(h_j^{TB})}{\prod_{i=0}^{MN_vN_F-1} q_{w,i}(w_i) \prod_{j=0}^{N_{an}N_{de}N_{do}U-1} \left(q_{h,j}(h_j^{TB})\right)^{MN_vN_F}}, \tag{32}$$

$$\forall\, b(h^{TB}, w) \in Q.$$

Formula (33) is substituted into Formula (32), the Bethe free energy can be obtained and is expressed as follows.

$$\begin{aligned} F_B(b) = &\sum_{i=0}^{MN_vN_F-1} D\{b_{y,i} \| p(y_i|w_i)\} + \sum_{i=0}^{MN_vN_F-1} D\{b_{w,i} \| p(w_i|h^{TB})\} + \\ &\sum_{j=0}^{N_{an}N_{de}N_{do}U-1} D\{b_{h,j} \| p(h_j^{TB})\} + H\{q_{w,i}\} + \sum_{j=0}^{N_{an}N_{de}N_{do}U-1} MN_vN_F H\{q_{h,j}\}, \end{aligned} \tag{33}$$

where $H\{\cdot\}$ denotes entropy. Further, the following constraint conditions are introduced.

$$E\{w_i \mid b_{y,i}\} = E\{w_i \mid b_{w,i}\} = E\{w_i \mid q_{w,i}\} \tag{34}$$

$$E\{h_j^{TB} \mid b_{h,j}\} = E\{h_j^{TB} \mid b_{w,i}\} = E\{h_j^{TB} \mid q_{h,j}\} \tag{35}$$

-continued $$E\{|w_i|^2 \mid b_{y,i}\} = E\{|w_i|^2 \mid b_{w,i}\} = E\{|w_i|^2 \mid q_{w,i}\} \tag{36}$$

$$E\{|h_j^{TB}|^2 \mid b_{h,j}\} = \frac{1}{MN_vN_F}\sum_{i=0}^{MN_vN_F-1} E\{|h_j^{TB}|^2 \mid b_{w,i}\} = E\{|h_j^{TB}|^2 \mid q_{h,j}\}, \tag{37}$$

where Formula (35) and Formula (36) denote mean square consistency constraints, Formula (37) denotes the mean square consistency constraint, and Formula (38) denotes mean square consistency constraint. It is note that the constraints herein are not unique. For example, the mean square consistency constraint can be replaced with the variance consistency constraint, and the average mean square consistency constraint can be replaced with the average variance consistency constraint and different constraint conditions can derive different algorithms. Finally, the channel estimation problem is transformed into the following problem for minimizing constrained Bethe free energy, and the problem is expressed as $$\min F_B(b) \text{ s.t. } (35), (36), (37), \text{ and } (38). \tag{38}$$

$$b_h = \prod_{j=0}^{N_{an}N_{de}N_{do}U-1} b_{h,j}, \text{ and } e = [1, 1, \cdots, 1]^T \in \square^{N_{an}N_{de}N_{do}U\times 1}$$

are defined, where $(\cdot)^{o-1}$ denotes the inverse of each element in the vector and Var{·} denotes the variance. The Lagrange multiplier method can be used to solve problem for minimizing constrained Bethe free energy mentioned above, and the obtained channel estimation algorithm on the basis of minimizing the constrained Bethe free energy is expressed as follows.

In Step 1, $p(h^{TB}) \propto CN(h^{TB}; 0, R^{TB})$, where $CN(h^{TB}; 0, R^{TB})$ denotes the probability density function of a cyclically symmetric complex Gaussian distribution with the mean of 0 and the covariance of $R^{TB}$, and 0 denotes the vector all with 0.

In Step 2, $b_h = p(h^{TB})$, $\eta^{h,b_h} = 0$ is initialized.

In Step 3, $$\eta^{h,b_w} = -\text{Var}\{h^{TB}|b_h\}^{\circ-1} - \frac{1}{MN_vN_F}\eta^{h,b_h}$$

In Step 4, $$\eta^{h,b_h} = MN_vN_F\left(\left(\sigma_p^2 e^T\left(\eta^{h,b_w}\right)^{\circ-1} - \sigma_z^2\right)\sigma_p^{-2}e - \left(\eta^{h,b_w}\right)^{\circ-1}\right)^{\circ-1}.$$

In Step 5, $$\tilde{\tau}^{h,b_w} = E\{h^{TB}|b_h\} \circ \text{Var}\{h^{TB}|b_h\}^{\circ-1}.$$

In Step 6, $$\kappa = \tilde{\tau}^{h,b_w} \circ \left(\eta^{h,b_w}\right)^{\circ-1}.$$

In Step 7, $$\Psi = A\kappa.$$

In Step 8, $$\zeta = \frac{1}{MN_vN_F\sigma_p^2}A^H(y+\Psi) - \kappa.$$

In Step 9, $b_h \propto p(h^{TN})\, CN(h^{TB}; \zeta, \text{diag}\{-(\eta^{h,b_h})^{o-1}\})$, it is determined that whether the algorithm converges or satisfies other termination conditions. In a case where the algorithm converges or satisfies other termination conditions, Step 10 is proceeded; otherwise, Step 3 is returned to.

Step 10, the channel estimation result $\hat{h}^{TB} = E\{h^{TB}|b_h\}$ is output.

In the process of the algorithm above, damping factors can be introduced to ensure the convergence of the algorithm.

5. Low Complexity Implementation of Channel Estimation Algorithm

The complexity of each iteration of the channel estimation algorithm on the basis of minimizing the constrained Bethe free energy above is expressed as $O(MN_vN_FN_{an}N_{de}N_{do}U)$, and is mainly obtained from Step 7 and Step 8. Due to the structural characteristics of the triple beam matrix, all operations involving the triple beam matrix or the conjugate transpose of the triple beam matrix multiplied by vectors can be quickly implemented through the chirp-z transform. Specifically, according to Formula (26) and Formula (27), Step 7 and Step 8 can be rewritten as $$\Psi = \sigma_p x_c\left(\tilde{D} \otimes \left(V\left(U \otimes I_{N_{an}}\right)\right)\right)[S_0, \cdots, S_{U-1}]\kappa \tag{39}$$

$$\zeta = \frac{1}{MN_vN_F\sigma_p^2}\left(\sigma_p[S_0, \cdots, S_{U-1}]^H\left(\tilde{D}^H \otimes \left(\left(\overline{U}^H \otimes I_{N_{an}}\right)V^H\right)\right)X_c^H(y+\Psi) - \sigma_p^2\kappa\right), \tag{40}$$

where according to the chirp-z transform, $V_k$, $\overline{U}$ and $\tilde{D}$ can be rewritten as $$V_k = \text{diag}\{\xi_{W_{S,k},N_{an},0,M}\}F^H_{N_{(S)}\times M}\,\text{diag}\{\tilde{\xi}_{W_{S,k},M,N_{an},N_{(S)}}\}F_{N_{(S)}\times N_{an}}\,\text{diag}\{\xi_{W_{S,k},0,0,N_{an}}\} \tag{41}$$

$$\overline{U} = \text{diag}\{\xi_{W_F,0,0,N_v}\}F^H_{N_{(F)}\times N_v}\,\text{diag}\{\tilde{\xi}_{W_F,N_vN_{de},N_{(F)}}\}F_{N_{(F)}\times N_{de}}\,\text{diag}\{\xi_{W_F,-2k_0,0,N_{de}}\} \tag{42}$$

$$\tilde{D} = \text{diag}\left\{\xi_{W_T,N_{do},\frac{n_pN_{do}}{N_S},N_F}\right\}F^H_{N_{(T)}\times N_F}\,\text{diag}\{\tilde{\xi}_{W_T,N_F,N_{do},N_{(T)}}\}F_{N_{(T)}\times N_{do}}\,\text{diag}\left\{\xi_{W_T,-\frac{2n_p}{N_S},0,N_{do}}\right\}, \tag{43}$$

where $F_N$ denotes the unitary discrete Fourier transform matrix of the point N, $F_{N\times G}$ denotes the matrix composed of the previous G (G≤N)-th columns of $F_N$, and $N_{(F)}$ as well as $N_{(T)}$ denote integers that are greater than or equal to $M+N_{an}-1$, $N_v+[N_v/N_\tau]N_{de}-1$ and $N_F+N_{do}-1$, respectively.

$$W_{S,k}=e^{-\varnothing\frac{4\pi(f_c+k\Delta f)\Delta\tau}{N_{an}}},\ W_F=e^{-\varnothing\frac{2\pi N_\tau}{N_{de}N_v}},\ W_T=e^{\frac{2\pi N_d N_S}{N_{do}N}},$$

$$\xi_{W,\alpha_1,\alpha_2,N}\in\square^{N\times 1},\ \left[\xi_{W,\alpha_1,\alpha_2,N}\right]_i=W^{(i^2-\alpha_1 i-\alpha_2)/2},$$

$$\text{and } \xi_{W,N_1,N_2,N}=\sqrt{N}F_N\left[\xi^H_{W,0,0,N_1},0,\xi^H_{W,2(N_2-1),-(N_2-1)^2,N_2-1}\right]^T\in\square^{N\times 1}.$$

Due to the fact that the complexity can be reduced by fast Fourier transform through discrete Fourier transform, the complexities of Step 7 and Step 8 are reduced to $$O(N_{an}N_{do}N_{(F)}\log_2 N_{(F)}+N_vN_{do}N_{(S)}\log_2 N_{(S)}+MN_vN_{(T)}\log_2 N_{(T)})$$

$$O(N_vN_FN_{(S)}\log_2 N_{(S)}+N_{an}N_FN_{(F)}\log_2 N_{(F)}+N_{an}N_{de}N_{(T)}\log_2 N_{(T)}).$$

6. Spatial-Frequency-Time Domain Channel Acquisition of Pilot Frequency Band and Data Band According to the triple beam-based statistical channel model, the spatial-frequency-time domain channel vector for the pilot band and data band can be obtained by left multiplying the estimated triple beam domain channel vector by the triple beam matrix. Specifically, according to Formula (17), the spatial frequency time domain channel estimation results of $N_F$ time slots of all users can be expressed as $$\hat{h}^{SFT}=(I_U\otimes P)\hat{h}^{TB},\tag{44}$$

where $$\hat{h}^{SFT}=\left[(\hat{h}_0^{SFT})^T,(\hat{h}_1^{SFT})^T,\cdots,\left(h_{U-1}^{SFT}\right)^T\right]^T\in\square^{MN_vN_FU\times 1},$$

$$\text{and } \hat{h}_u^{SFT}\in\square^{MN_vN_F\times 1}$$

denotes the spatial-frequency-time domain channel estimation result of the entire frame of the user u. Therefore, the spatial-frequency-domain channel vector for the user u on the $n_s$-th OFDM symbol at the current frame can be expressed as $$\hat{h}_{u,n_s}^{SF}=[\hat{h}_u^{SFT}]_{((N_F-1)N_S+n_S)MN_v:((N_F-1)N_S+n_S+1)MN_v-1}\in\square^{MN_v\times 1},\tag{45}$$

where $n_s=0,1,\ldots,N_S-1$.

7. Implementation Effect

In order to enable a person skilled in the art to better understand the solution of the present disclosure, given below is the performance results of the method for acquiring channel information in this embodiment under specific configurations.

By considering a skywave massive MIMO-OFDM communication system, the system parameters are set as follows. The carrier frequency is set as $f_c$=16 MHZ, subcarrier spacing is set as $\Delta f$=250 Hz, the number of subcarriers is set as $N_c$=2048, the cyclic prefix length is set as $N_g$=512, the base station antenna spacing is set as d=9 m, the frame structure is ($N_F$, $N_S$, $n_p$)=(8,14,6), the user movement speed is set as $v_u$=30/100/250 km/h, the Doppler spread introduced by ionosphere is 0.5 Hz, $N_d$=8, and the refinement factors $F_{an}=N_{an}/M$, $F_{de}=N_{de}/N_\tau$ and $F_{de}=N_{do}/N_d$ of the triple beam-based statistical channel model are defined. For the convenience of expression, the algorithm for grouping users and scheduling pilots based on triple beam domain statistical channel information is simplifiedly recorded as TB-UG, the algorithm for grouping users and scheduling pilots based on spatial beam domain statistical channel information is simplifiedly recorded as B-UG, the algorithm for randomly grouping users and scheduling pilots is simplifiedly recorded as Random-UG, and the channel estimation algorithm based on minimizing constrained Bethe free energy is simplifiedly recorded as CBFEM-CE.

Figure 4:
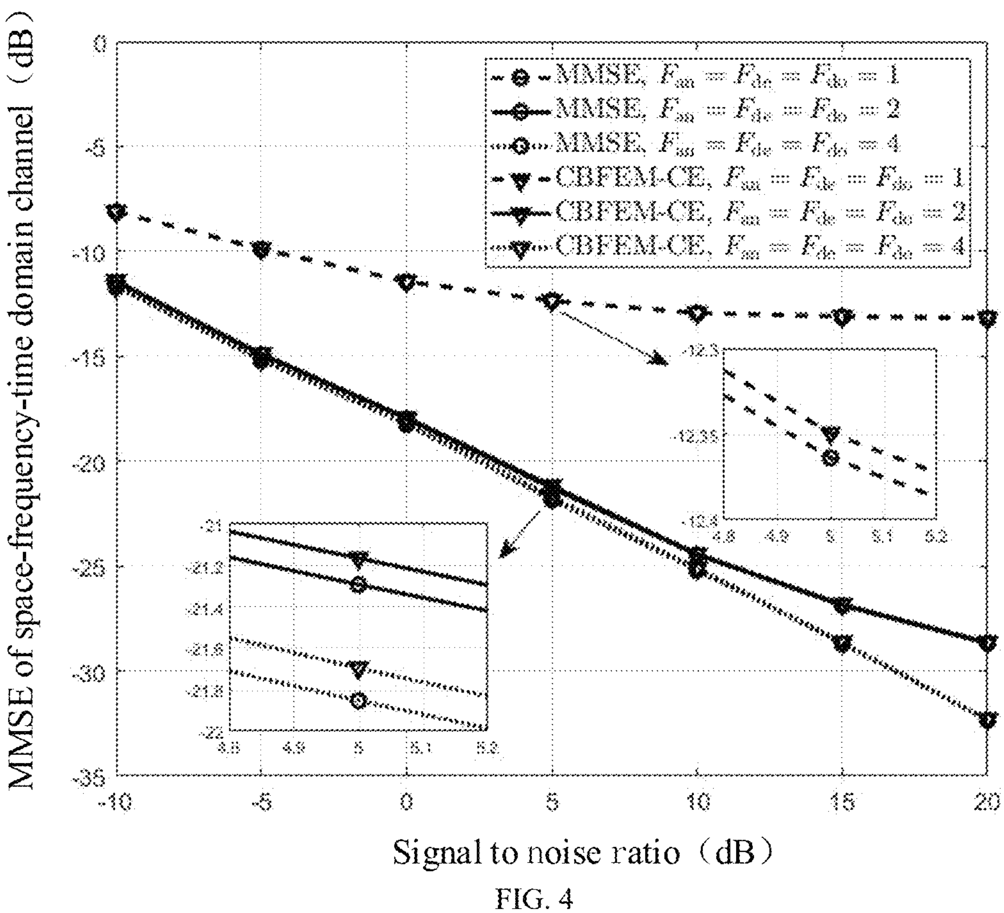
FIG. 4 illustrates a performance comparison diagram between a channel estimation algorithm on the basis of minimizing the constrained Bethe free energy and a Minimum Mean-Squared Error (MMSE) estimation under different triple beam-based statistical channel model configurations provided by one embodiment of the present disclosure.

Firstly, given is a comparison of the estimation performances between the CBFEM-CE estimation and MMSE estimation in the embodiments, which is as illustrated in FIG. 4. Where the number of base station antennas is set as M=64, the number of effective subcarriers is reset as $N_v$=128, the number of users is set as U=32, the movement speed of the users is set as $v_u$=100 km/h, and TB-UG is adopted as the algorithm for grouping users and scheduling pilots, from which it can be observed that the proposed low complexity CBFEM-CE approaches to the performance of MMSE. And with the increase of refinement factor, the improvements of channel model accuracy can further enhance the performance of channel estimation.

Figure 5:
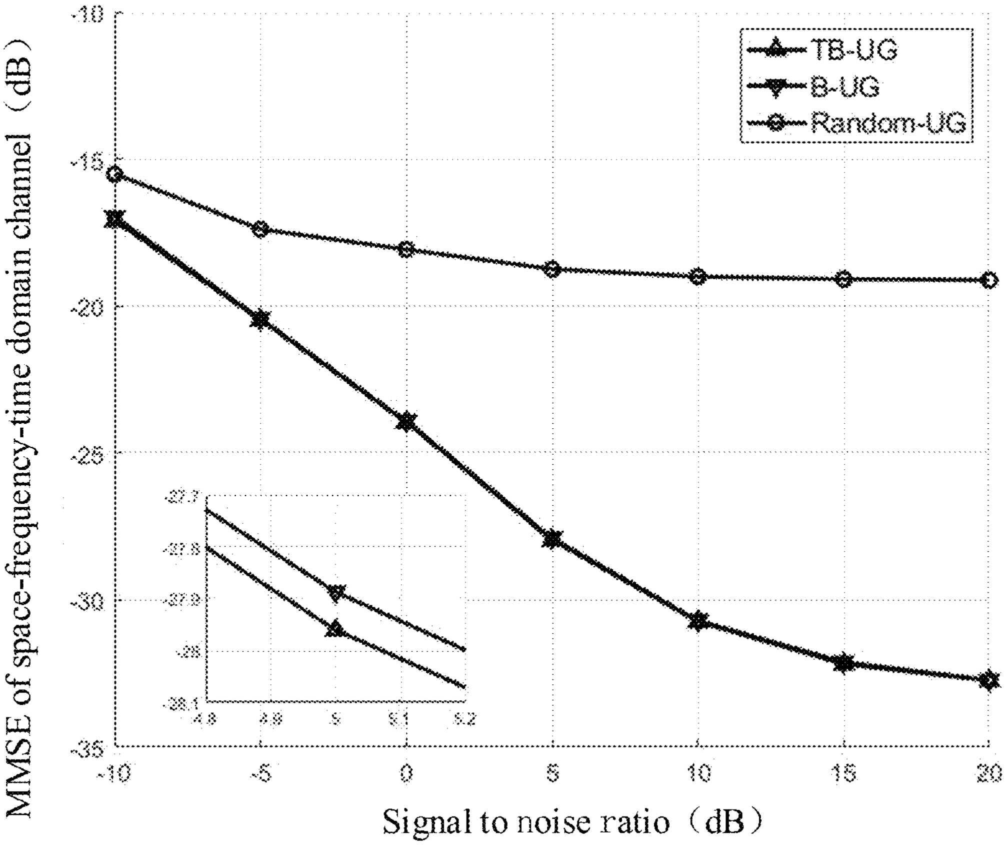
FIG. 5 illustrates a schematic diagram of a performance of the algorithm for grouping users and scheduling pilots provided by one embodiment of the present disclosure.

Next, given is the performance comparison of TB-UG, B-UG, and Random-UG in the embodiments, which is as illustrated in FIG. 5. Where the number of base station antennas is set as M=128, the number of effective subcarriers is set as $N_v$=1536, the number of, users is set as U=64, the movement speed of the users is set as $v_u$=100 km/h, and $F_{an}=F_{de}=F_{de}$=2 and CBFEM-CE is adopted as the channel estimation algorithm, from which it can be observed that both TB-UG and B-UG have significant performance gains compared to Random-UG, especially in the high signal-to-noise ratio situations, while the performance of TB-UG and B-UG is relatively similar with each other.

Figure 6:
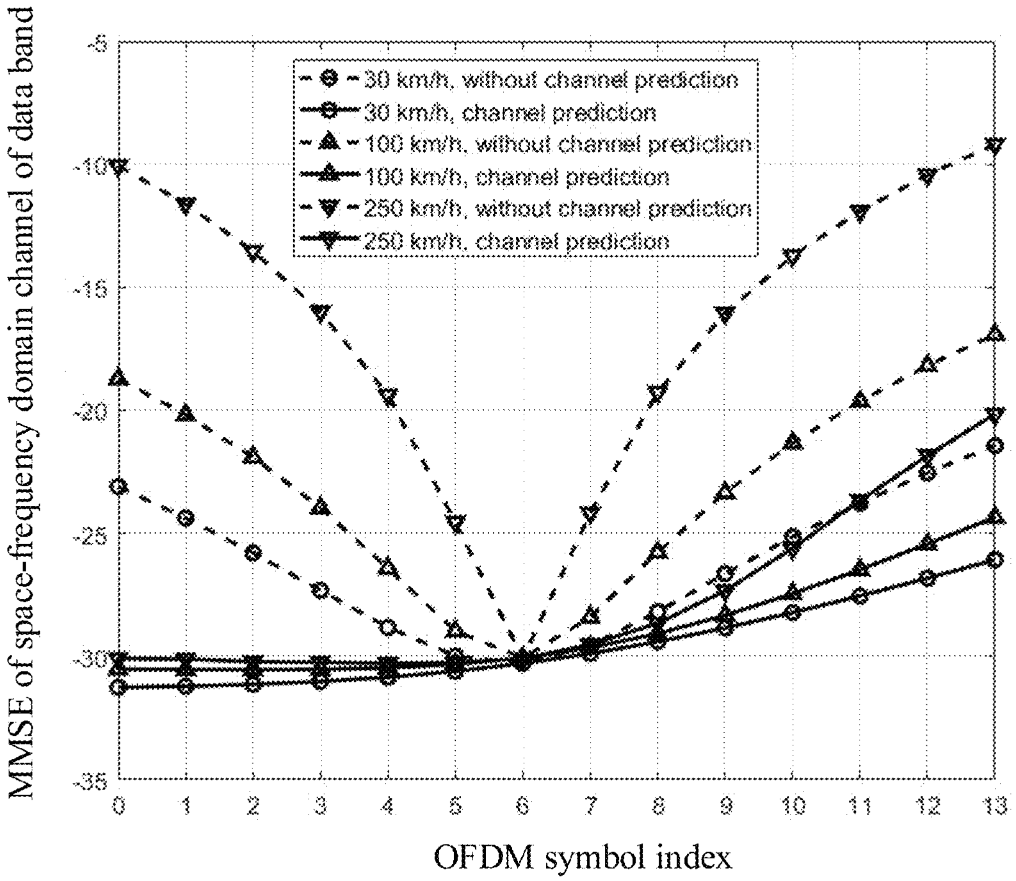
FIG. 6 illustrates a schematic diagram of a performance of obtaining spatial-frequency-time domain channel of a pilot band and a data band by utilizing the triple beam domain channel estimation results provided by one embodiment of the present disclosure.

Finally, given is the performance of utilizing the estimated triple beam domain channel vector in the embodiment to obtain the spatial-frequency-time domain channel vector for the entire pilot band and data band, which is as illustrated in FIG. 6. The number of base station antennas is set as M=128, the number of effective subcarriers is set as $N_v$=1536, the number of users is set as U=64, and $F_{an}=F_{de}=F_{de}$=2, the signal-to-noise ratio is set as 15 dB, CBFEM-CE is adopted as the channel estimation algorithm, and TB-UG is adopted as the algorithm for grouping users and scheduling pilots. The "with channel prediction" as illustrated in FIG. 6 denotes that the spatial-frequency-time domain channel vector for the data band is obtained by utilizing the estimated triple beam domain channel vector through Formula (45) and Formula (46), while "without channel prediction" denotes that the spatial-frequency-time domain channel vector for the pilot band is directly taken as the spatial-frequency-time domain channel vector for the data band. It can be observed, especially in high movement speed scenarios, that utilizing estimated triple beam domain channel vector to predict the spatial-frequency-time domain channel vector for the data band has significant performance advantages.

Based on the same inventive concept, disclosed is a computer device in the embodiments of the present disclosure, and the computer device includes a memory, a processor, and a computer program that is stored on the memory and can be executed on the processor. In a case where the computer program is loaded onto the processor, a skywave massive MIMO-OFDM triple beam-based channel modeling method, a method for grouping users and scheduling pilots of a skywave massive MIMO-OFDM or a method for estimating a skywave massive MIMO-OFDM channel can be implemented.

In specific implementations, the device includes a processor, a communication bus, a memory, and communication interfaces. The processor can be a general-purpose central processing unit (CPU), microprocessor, application specific integrated circuit (ASIC), or one or more integrated circuits configured to control the execution of the program of the present disclosure. The communication bus can include one pathway for transmitting information between the above components. Communication interfaces, using an arbitrary device such as a transceiver, configured to communication with other devices or communication networks. Memory can be a read-only memory (ROM) or other types of static storage devices that can store static information and instructions, random access memory (RAM) or other types of dynamic storage devices that can store information and instructions, as well as electrically erasable programmable read-only memory (EEPROM), read-only optical disks (CD-ROM) or other optical disk storage, disk storage media or other magnetic storage devices, or any other medium that can be used to carry or store desired program code in the form of instructions or data structures and can be accessed by a computer, but not limited to these. Memory can exist independently and be connected to the processor through a bus. Memory can also be integrated with the processor.

Memory is configured to store the application program code for executing the solution of the present disclosure, and is controlled by the processor for execution. The processor is configured to execute the application program code stored on the memory, thereby implementing the channel acquisition method provided in the above embodiments. A processor can include one or more CPUs, as well as a plurality of processors, each of the processors can be a single core processor or a multi-core processor. The processor herein can refer to one or more devices, circuits, and/or a processing core configured to process data (such as computer program instructions).

Based on the same inventive concept, disclosed is a skywave massive MIMO-OFDM communication system in the embodiments of the present disclosure, including a base station and a plurality of user terminals, where the base station is configured to generate a triple beam-based statistical channel model, and to utilize statistical channel information to group the users and schedule the pilots to each user; the base station utilizes the triple beam domain statistical channel information or the spatial beam domain statistical channel information to group users into groups; the base station allocates different pilot sequences to each user group, and users within the same group reuse the same pilot sequence, while users in different groups use different pilot sequences.

Based on the same inventive concept, disclosed is a skywave massive MIMO-OFDM communication system, including a base station and a plurality of user terminals, where the base station is configured to generate a triple beam-based statistical channel model, and obtain estimated triple beam domain channel vector by utilizing received pilot signals in an uplink, and obtain the spatial-frequency-time domain channel vectors of the pilot frequency band and a data band by utilizing the estimated triple beam domain channel vector according to the triple beam-based statistical channel model. The user terminals are used to send a pilot sequence in the pilot frequency band of the wireless frame in the uplink.

In the embodiments provided in the present disclosure, it should be understood that the disclosed methods can be implemented in other ways without exceeding the spirit and scope of the present disclosure. The current embodiments are merely exemplary examples and should not be taken as a limitation, and the specific contents given should not limit the objectives of the present disclosure. For example, some of the features can be ignored or not be executed.

The technical means disclosed in the present disclosure are not limited to the technical means disclosed in the above implementations, but also include the technical solutions composed of an arbitrary combination of the above technical features. It should be pointed out that for ordinary person skilled in the art, a plurality of improvements and embellishments can be made without departing from the principles of the present disclosure, and these improvements and embellishments are also considered to be within the protection scope of the present disclosure.

What is claimed is:

1. A method for grouping users and scheduling pilots of a skywave massive MIMO-OFDM, wherein the method comprises following steps:

generating a skywave massive MIMO-OFDM triple beam-based statistical channel model, wherein a spatial-frequency-time domain channel vector is expressed as a product of a triple beam matrix and a triple beam domain channel vector; the triple beam matrix is composed of sampled triple steering vectors corresponding to one set of sampling points of a direction cosine, a time delay, and a Doppler frequency that are selected by a base station; wherein each of the sampled triple steering vectors is called as one triple beam, and composed of a sampled spatial domain steering vector, a sampled frequency domain steering vector, and a sampled time domain steering vector; and the triple beam domain channel vector is one stochastic vector with independent and non identically distributed elements;

grouping, by utilizing triple beam domain statistical channel information or spatial beam domain statistical channel information, users, based on the triple beam-based statistical channel model through a base station; wherein the spatial beam domain statistical channel information is a sum of the triple beam domain statistical channel information along a frequency beam domain dimension and a time beam domain dimension; and allocating different pilot sequences to each of user groups by the base station, wherein users within one same group reuse one same pilot sequence, whereas users in different groups use different pilot sequences.

2. The method for grouping the users and scheduling the pilots of the skywave massive MIMO-OFDM according to claim 1, wherein criteria for grouping users are that a channel overlap between arbitrary two users in the same group should be minimized as much as possible; two users with high channel overlap should be allocated to different groups as much as possible.

3. The method for grouping the users and scheduling the pilots of the skywave massive MIMO-OFDM according to claim 2, wherein the channel overlap between the users is calculated and obtained by utilizing the triple beam domain statistical channel information or the spatial beam domain statistical channel information.

4. The method for grouping the users and scheduling the pilots of the skywave massive MIMO-OFDM according to claim 1, wherein the used pilot sequence is a sequence generated after modulating a Zadoff Chu sequence with different phase shift factors.

5. A computer device, wherein the device comprises a memory, a processor, and a computer program that is stored on the memory and is capable of running on the processor, the computer program is loaded onto the processor to implement the method according to claim 1.

6. The method for grouping the users and scheduling the pilots of the skywave massive MIMO-OFDM according to claim 1, wherein a sampling range of the direction cosine ranges from −1 to 1, a sampling range of the time delay ranges from 0 to a maximum time delay extension, and a sampling range of the Doppler frequency ranges from a negative maximum Doppler frequency to a positive maximum Doppler frequency; and a sampling method is uniform sampling.

7. The method for grouping the users and scheduling the pilots of the skywave massive MIMO-OFDM according to claim 1, wherein a number of the sampling points divided to the direction cosine, the time delay, and the Doppler frequency is a number that is greater than, equal to, or less than a number of antennas, a number of equivalent time delay extension points and a number of equivalent Doppler extension points, respectively; the equivalent delay extension points are obtained by multiplying a ratio of a number of effective subcarriers to a number of total subcarriers by a length of a cyclic prefix; and the equivalent Doppler spread points are obtained by multiplying twice the maximum Doppler frequency by a total duration of one frame.

8. The method for grouping the users and scheduling the pilots of the skywave massive MIMO-OFDM according to claim 1, includes a skywave massive MIMO-OFDM triple beam-based channel modeling method, wherein the method includes following steps:

selecting, by a base station, sampled triple steering vectors corresponding to one set of sampling points of a direction cosine, a time delay, and a Doppler frequency, to form a triple beam matrix, wherein each of the sampled triple steering vectors is called as one triple beam, and is composed of a sampled spatial domain steering vector, a sampled frequency domain steering vector, and a sampled time domain steering vector;

multiplying the triple beam matrix with the triple beam domain channel vector, and obtaining a spatial-frequency-time domain channel vector; wherein the triple beam domain channel vector is one stochastic vector with independent and non identically distributed elements.

9. A method for estimating a skywave massive MIMO-OFDM channel, wherein the method comprises following steps:

generating a skywave massive MIMO-OFDM triple beam-based statistical channel model, wherein a spatial-frequency-time domain channel vector is expressed as a product of a triple beam matrix and a triple beam domain channel vector; the triple beam matrix is composed of sampled triple steering vectors corresponding to one set of sampling points of a direction cosine, a time delay, and a Doppler frequency that are selected by a base station; wherein each of the sampled triple steering vectors is called as one triple beam, and composed of a sampled spatial domain steering vector, a sampled frequency domain steering vector, and a sampled time domain steering vector; and the triple beam domain channel vector is one stochastic vector with independent and non identically distributed elements;

receiving, by a base station, pilot signals sent by each of the users in a pilot frequency band of a wireless frame in an uplink, and obtaining, by utilizing received pilot signals, estimated triple beam domain channel vector; and obtaining, by utilizing the estimated triple beam domain channel vector, the spatial-frequency-time domain channel vectors for the pilot frequency band and a data band according to the triple beam-based statistical channel model.

10. The method for estimating the skywave massive MIMO-OFDM channel according to claim 9, wherein a channel estimation algorithm based on a minimization constraint of Bethe free energy is adopted as an estimation algorithm of the triple beam domain channel vector.

11. The method for estimating the skywave massive MIMO-OFDM channel according to claim 10, wherein the channel estimation algorithm based on a minimization constraint of the Bethe free energy transforms a channel estimation problem into an optimization problem that minimizes the constraint of the Bethe free energy, an objective function of the optimization problem is the Bethe free energy, and constraint conditions include various combinations of a mean consistency constraint, a mean square consistency constraint, a variance consistency constraint, an average mean square consistency constraint, and a mean variance consistency constraint.

12. The method for estimating the skywave massive MIMO-OFDM channel according to claim 11, wherein a Lagrange multiplier method is adopted as a solving method of the optimization problem.

13. The method for estimating the skywave massive MIMO-OFDM channel according to claim 9, wherein in a process of a channel estimation as well as in a transformation process between the triple beam domain channel vector and the spatial-frequency-time domain channel vector, operations involving a triple beam matrix or a conjugate transpose multiplied vector for the triple beam matrix are quickly implemented through a chirp-z transform.

14. A computer device, wherein the device comprises a memory, a processor, and a computer program that is stored on the memory and is capable of running on the processor, the computer program is loaded onto the processor to implement the method according to claim 9.

15. A skywave massive MIMO-OFDM communication system, comprising a base station and a plurality of user terminals, wherein the base station is configured to generate a triple beam-based statistical channel model, and utilize the statistical channel information to group each of the users and schedule the pilot for each of the users; wherein in the triple beam-based statistical channel model, the spatial-frequency-time domain channel vector is expressed as a product of a triple beam matrix and a triple beam domain channel vector; the triple beam matrix is composed of sampled triple steering vectors corresponding to one set of sampling points of a direction cosine, a time delay, and a Doppler frequency that are selected by a base station; wherein each of the sampled triple steering vectors is called as a triple beam, and composed of a sampled spatial domain steering vector, a sampled frequency domain steering vector, and a sampled time domain steering vector; and the triple beam domain channel vector is one stochastic vector with independent and non identically distributed elements;

users are grouped by utilizing triple beam domain statistical channel information or spatial beam domain statistical channel information, through the base station; the spatial beam domain statistical channel information is a sum of the triple beam domain statistical channel information along a frequency beam domain dimension and a time beam domain dimension; and each of user groups is allocated to different pilot sequences by the base station, users within one same group reuse one same pilot sequence, whereas users in different groups use different pilot sequences.

16. A skywave massive MIMO-OFDM communication system, comprising a base station and a plurality of user terminals, wherein the base station is configured to generate a triple beam-based statistical channel model, and utilize received pilot signals to obtain estimated triple beam domain channel vector in an uplink; and utilize the estimated triple beam domain channel vector to obtain the spatial-frequency-time domain channel vectors for the pilot frequency band and a data band according to the triple beam-based statistical channel model; and the user terminals are used to send a pilot sequence in the pilot frequency band of the wireless frame in the uplink; wherein in the triple beam-based statistical channel model, the spatial-frequency-time domain channel vector is expressed as a product of a triple beam matrix and a triple beam domain channel vector; the triple beam matrix is composed of sampled triple steering vectors corresponding to one set of sampling points of a direction cosine, a time delay, and a Doppler frequency that are selected by the base station; wherein each of the sampled triple steering vectors is called as a triple beam, and composed of a sampled spatial domain steering vector, a sampled frequency domain steering vector, and a sampled time domain steering vector; and the triple beam domain channel vector is one stochastic vector with independent and non identically distributed elements.

* * * * *